US009667468B2

United States Patent
Chikirivao et al.

(10) Patent No.: US 9,667,468 B2
(45) Date of Patent: May 30, 2017

(54) DATA-TYPE DEFINITION DRIVEN DYNAMIC BUSINESS COMPONENT INSTANTIATION AND EXECUTION FRAMEWORK AND SYSTEM AND METHOD FOR MANAGING KNOWLEDGE INFORMATION

(75) Inventors: Bill S. Chikirivao, Aurora, CO (US); Robert C. Bodnar, Highlands Ranch, CO (US); Craig Hurst, Broomfield, CO (US)

(73) Assignee: WELLOGIX TECHNOLOGY LICENSING, LLC, Houston, TX (US)

( * ) Notice: Subject to any disclaimer, the term of this patent is extended or adjusted under 35 U.S.C. 154(b) by 1080 days.

(21) Appl. No.: 13/432,841

(22) Filed: Mar. 28, 2012

(65) Prior Publication Data

US 2012/0246556 A1 Sep. 27, 2012

Related U.S. Application Data

(60) Division of application No. 11/249,612, filed on Oct. 13, 2005, now Pat. No. 8,171,397, which is a
(Continued)

(51) Int. Cl.
*G06F 17/00* (2006.01)
*H04L 29/06* (2006.01)
(Continued)

(52) U.S. Cl.
CPC ............ *H04L 29/06* (2013.01); *G06F 17/227* (2013.01); *G06Q 10/06* (2013.01); *G06Q 10/10* (2013.01); *G06Q 30/06* (2013.01); *H04L 67/02* (2013.01)

(58) Field of Classification Search
CPC ............ G06F 17/227; G06F 17/30076; G06F 17/3092; G06F 8/20
See application file for complete search history.

(56) References Cited

U.S. PATENT DOCUMENTS 5,168,445 A 12/1992 Kawashima et al.
5,446,885 A 8/1995 Moore et al.
(Continued)

FOREIGN PATENT DOCUMENTS

WO WO 0167354 A1 9/2001

OTHER PUBLICATIONS

Cary N. Prague and Michael R. Irwin, "Microsoft Access 2000 Bible," copyrighted in 1999 by IDG Books Worldwide, Inc., US.
(Continued)

*Primary Examiner* — Laurie Ries
(74) *Attorney, Agent, or Firm* — Birch, Stewart, Kolasch & Birch, LLP

(57) ABSTRACT

In a complex workflow environment, a data-type-definition (DTD) schema drives a dynamic business component instantiation and execution framework that integrates documents with data and information created by various applications, potentially operating on several different platforms, enabling complex workflow and collaboration to occur over a communication network such as the Internet. The DTD execution language is preferably an industry specific XML-based tag set that defines business component instantiation, execution, input and output parameters, workflow, user profile, and collaboration specifications for a given task or data in a complex workflow process. Business and data processing components available on systems both within and outside the complex workflow system are called upon to provide the processing, interpretation, and transformation functions for the complex workflow system. The results of such processing are then returned to the complex workflow system for integration within the workflow process.

34 Claims, 11 Drawing Sheets

Related U.S. Application Data continuation-in-part of application No. 10/121,310, filed on Apr. 12, 2002, and a continuation-in-part of application No. 10/125,120, filed on Apr. 17, 2002, now Pat. No. 7,669,133.

(60) Provisional application No. 60/283,701, filed on Apr. 12, 2001, provisional application No. 60/359,923, filed on Feb. 25, 2002.

(51) Int. Cl.
| | | |
|---|---|---|
| *G06F 17/22* | (2006.01) | |
| *G06Q 10/06* | (2012.01) | |
| *G06Q 10/10* | (2012.01) | |
| *G06Q 30/06* | (2012.01) | |
| *H04L 29/08* | (2006.01) | |

(56) References Cited

U.S. PATENT DOCUMENTS

| | | | |
|---|---|---|---|
| 5,634,054 A | 5/1997 | Sarachan | |
| 5,734,837 A * | 3/1998 | Flores et al. | 705/7.13 |
| 5,737,739 A | 4/1998 | Shirley et al. | |
| 5,838,971 A | 11/1998 | Stadler et al. | |
| 5,862,325 A | 1/1999 | Reed et al. | |
| 5,870,545 A * | 2/1999 | Davis et al. | 709/201 |
| 5,890,130 A * | 3/1999 | Cox et al. | 705/7.27 |
| 5,920,879 A | 7/1999 | Kyojima et al. | |
| 6,044,205 A | 3/2000 | Reed et al. | |
| 6,088,717 A | 7/2000 | Reed et al. | |
| 6,112,199 A | 8/2000 | Nelson | |
| 6,225,998 B1 * | 5/2001 | Okita et al. | 715/853 |
| 6,237,041 B1 | 5/2001 | Håål et al. | |
| 6,243,092 B1 * | 6/2001 | Okita et al. | 715/866 |
| 6,250,309 B1 | 6/2001 | Krichen et al. | |
| 6,263,485 B1 | 7/2001 | Schofield | |
| 6,279,006 B1 | 8/2001 | Shigemi et al. | |
| 6,314,434 B1 | 11/2001 | Shigemi et al. | |
| 6,321,217 B1 | 11/2001 | Maeda et al. | |
| 6,345,278 B1 | 2/2002 | Hitchcock et al. | |
| 6,345,288 B1 | 2/2002 | Reed et al. | |
| 6,349,305 B1 | 2/2002 | Hara et al. | |
| 6,421,667 B1 * | 7/2002 | Codd et al. | |
| 6,421,691 B1 * | 7/2002 | Kajitani | 715/234 |
| 6,658,624 B1 | 12/2003 | Savitzky et al. | |
| 6,772,216 B1 | 8/2004 | Ankireddipally et al. | |
| 6,820,069 B1 | 11/2004 | Kogan et al. | |
| 6,845,155 B2 | 1/2005 | Elsey | |
| 6,968,328 B1 | 11/2005 | Kintzer et al. | |
| 7,076,728 B2 * | 7/2006 | Davis et al. | 715/205 |
| 7,287,217 B2 | 10/2007 | Kuznetsov et al. | |
| 7,308,646 B1 | 12/2007 | Cohen et al. | |
| 7,503,032 B2 * | 3/2009 | Bhaskaran et al. | 717/104 |
| 7,546,602 B2 * | 6/2009 | Hejlsberg et al. | 719/313 |
| 7,945,492 B1 * | 5/2011 | Sun | G06Q 10/08 705/28 |
| 2001/0027459 A1 | 10/2001 | Royal | |
| 2001/0037346 A1 | 11/2001 | Johnson | |
| 2001/0047385 A1 | 11/2001 | Tuatini | |
| 2002/0010781 A1 | 1/2002 | Tuatini | |
| 2002/0013790 A1 | 1/2002 | Vandersluis | |
| 2002/0023654 A1 | 2/2002 | Webb | |
| 2002/0026471 A1 | 2/2002 | Bent et al. | |
| 2002/0029304 A1 | 3/2002 | Reynar et al. | |
| 2002/0032693 A1 | 3/2002 | Chiou et al. | |
| 2002/0032709 A1 | 3/2002 | Lessner | |
| 2002/0032783 A1 | 3/2002 | Tuatini | |
| 2002/0035528 A1 | 3/2002 | Simpson et al. | |
| 2002/0143823 A1 * | 10/2002 | Stevens | 707/523 |
| 2002/0147850 A1 | 10/2002 | Richards et al. | |
| 2003/0008650 A1 | 1/2003 | Matsuyama et al. | |
| 2003/0018951 A1 * | 1/2003 | Srivastava et al. | 717/101 |
| 2003/0055815 A1 | 3/2003 | Chender et al. | |
| 2003/0154144 A1 | 8/2003 | Pokorny et al. | |
| 2004/0039720 A1 | 2/2004 | Hodges et al. | |
| 2004/0220791 A1 * | 11/2004 | Lamkin et al. | 703/11 |
| 2005/0234894 A1 * | 10/2005 | Tenazas | G06F 17/30678 |

OTHER PUBLICATIONS

Dennis L. Prince, "Getting Started with SAPTM R/3TM," copyrighted in 1998 by Prima Publishing, US.

Elaine Marmel, "Microsoft Project 2000 Bible," copyrighted in 2000 by IDG Books Worldwide, Inc., US.

Grady Booch, "Object-Oriented Analysis and Design with Applications," Second Edition, copyrighted in 1994 by The Benjamin/Cummings Publishing Company, Inc., US.

John Hedtke, "Peachtree Accounting for Windows Made Easy," copyrighted in 1995 by McGraw-Hill, Inc., US.

M. Zamora and M.A. Merchant, M-1 Drilling Fluids Co., "Optimized PC-Based Expert Systems," Petroleum Industry Application of Microcomputers, Jun. 23, 1987, US.

M.J. Fear, N.C. Meany, J.M. Evans, "An Expert System for Drill Bit Selection," IADC/SPE Drilling Conference, published Feb. 15, 1994, US.

Selected Excerpts from the SAP R/3 Online Help for R/3 version 4.5B, released in Mar. 1999.

Simon Sharpe, "10 Minute Guide to SAP R/3," copyrighted in 1997 by Que Corporation, US.

Office Action of U.S. Appl. No. 10/121,310 dated Nov. 4, 2016.

* cited by examiner

FIG. 3

```
<wellXML doctype=dailyDrillingReport>
  <project>
    <well>
      <dailyDrillingReport>
        <operational>
          <wellName>CRP #3</wellName>
          <wellID>1795</wellID>
          <eventType>Drilling</eventType>
          <eventSeqNumber>1</eventSeqNumber>
          <fieldName>Duval South</fieldName>
          <reportNumber>53</reportNumber>
          <reportDate>1998-04-27</reportDate>
          <reportTime/>
          <operatorName>Wellogix Operator - DevBox</operatorName>
          <supervisorName/>
          <rigContractor>Sedco Forex</rigContractor>
          <rigNameNumber>Rig 1</rigNameNumber>
          <rigAcceptDate>1998-03-06</rigAcceptDate>
          <rigAcceptTime>1630</rigAcceptTime>
          <rigReleaseDate>1998-04-26</rigReleaseDate>
          <rigReleaseTime>2400</rigReleaseTime>
          <spudDate>1998-03-07</spudDate>
          <spudTime>800</spudTime>
          <daysSinceSpud>51</daysSinceSpud>
          <groundElev>853</groundElev>
          <depthRefType>KB</depthRefType>
          <depthRefValue>19.50</depthRefValue>
          <lastCasingSize/>
          <lastCasingDepth>9287</lastCasingDepth>
          <depthAtReportTime>14645</depthAtReportTime>
          <depthTVDAtReportTime>14645</depthTVDAtReportTime>
          <drillLast24hrs/>
          <dailyForecast/>
          <dailySummary/>
          <currentOperation>Release rig</currentOperation>
          <shoeTest/>
          <totalDailyCost>13506</totalDailyCost>
          <phaseOfOperation>Move</phaseOfOperation>
        </operational>
        <holeSummary>
          <wellID>1795</wellID>
          <eventType>Drilling</eventType>
          <eventSeqNumber>1</eventSeqNumber>
          <holeSection>Conductor</holeSection>
          <holeDiameter>20</holeDiameter>
          <topMD>0</topMD>
          <bottomMD>40</bottomMD>
          <topTVD>0</topTVD>
          <bottomTVD>40</bottomTVD>
        </holeSummary>
        <casingSummary>
          <wellID>1795</wellID>
          <eventType>Drilling</eventType>
          <eventSeqNumber>1</eventSeqNumber>
          <holeSection>Conductor</holeSection>
          <casingSize>20</casingSize>
          <casingWeight/>
          <casingGrade/>
          <threads>8R</threads>
          <topMD>19.50</topMD>
          <bottomMD>59.50</bottomMD>
          <topTVD>19.50</topTVD>
          <bottomTVD>59.50</bottomTVD>
        </casingSummary>
      </dailyDrillingReport>
    </well>
  </project>
</wellXML>
```

FIG. 3A

```xml
<wellXML doctype=dailyDrillingReport>
  <project>
    <well>
      <dailyDrillingReport>
        <operational>
          <wellName>CRP #3</wellName>
          <wellID>1795</wellID>
          <eventType>Drilling</eventType>
          <eventSeqNumber>1</eventSeqNumber>
          <fieldName>Duval South</fieldName>
          <reportNumber>53</reportNumber>
          <reportDate>1998-04-27</reportDate>
          <reportTime/>
          <operatorName>Wellogix Operator - DevBox</operatorName>
          <supervisorName/>
          <rigContractor>Sedco Forex</rigContractor>
          <rigNameNumber>Rig 1</rigNameNumber>
          <rigAcceptDate>1998-03-06</rigAcceptDate>
          <rigAcceptTime>1630</rigAcceptTime>
          <rigReleaseDate>1998-04-26</rigReleaseDate>
          <rigReleaseTime>2400</rigReleaseTime>
          <spudDate>1998-03-07</spudDate>
          <spudTime>800</spudTime>
          <daysSinceSpud>51</daysSinceSpud>
          <groundElev>853</groundElev>
          <depthRefType>KB</depthRefType>
          <depthRefValue>19.50</depthRefValue>
          <lastCasingSize/>
          <lastCasingDepth>9287</lastCasingDepth>
          <depthAtReportTime>14645</depthAtReportTime>
          <depthTVDAtReportTime>14645</depthTVDAtReportTime>
          <drillLast24hrs/>
          <dailyForecast/>
          <dailySummary/>
          <currentOperation>Release rig</currentOperation>
          <shoeTest/>
          <totalDailyCost>13506</totalDailyCost>
          <phaseOfOperation>Move</phaseOfOperation>
        </operational>
        <holeSummary>
          <wellID>1795</wellID>
          <eventType>Drilling</eventType>
          <eventSeqNumber>1</eventSeqNumber>
          <holeSection>Conductor</holeSection>
          <holeDiameter>20</holeDiameter>
          <topMD>0</topMD>
          <bottomMD>40</bottomMD>
          <topTVD>0</topTVD>
          <bottomTVD>40</bottomTVD>
        </holeSummary>
        <casingSummary>
          <wellID>1795</wellID>
          <eventType>Drilling</eventType>
          <eventSeqNumber>1</eventSeqNumber>
          <holeSection>Conductor</holeSection>
          <casingSize>20</casingSize>
          <casingWeight/>
          <casingGrade/>
          <threads>8R</threads>
          <topMD>19.50</topMD>
          <bottomMD>59.50</bottomMD>
          <topTVD>19.50</topTVD>
          <bottomTVD>59.50</bottomTVD>
        </casingSummary>
      </dailyDrillingReport>
    </well>
  </project>
</wellXML>
```

DATA-TYPE DEFINITION DRIVEN DYNAMIC BUSINESS COMPONENT INSTANTIATION AND EXECUTION FRAMEWORK AND SYSTEM AND METHOD FOR MANAGING KNOWLEDGE INFORMATION

CROSS REFERENCE TO RELATED APPLICATIONS

This application is a Divisional of copending application Ser. No. 11/249,612 filed on Oct. 13, 2005, which is a continuation-in-part of U.S. application Ser. No. 10/121,310 filed Apr. 12, 2002 entitled Data-Type Definition Driven Dynamic Business Component Instantiation and Execution Framework, which is a continuation-in-part of U.S. patent application Ser. No. 10/125,120 filed Apr. 17, 2002 (issued as U.S. Pat. No. 7,669,133 on Feb. 23, 2010) entitled System and Method for Developing Rules Utilized in a Knowledge Management System, which claims the benefit of priority of U.S. provisional application Ser. No. 60/283,701 filed Apr. 12, 2001 entitled Data-Type Definition Driven Dynamic Business Component Instantiation and Execution Framework, which also claims the benefit of priority to U.S. provisional patent application Ser. No. 60/359,923 filed Feb. 25, 2002 entitled Operational Event Summary. The entire contents of all of the above applications is hereby incorporated by reference.

BACKGROUND OF THE INVENTION

1. Field of Invention

This invention relates generally to the use of data-type definition language to identify types of electronic files and provide functional instructions for the processing of such files. The invention further relates to systems for managing workflow processes over a communication network.

2. Description of the Related Art

Present systems for enhancing business workflow, whether intra-business or inter-business are generally limited to the scope of the information subject matter they were designed to address. For example, some accounting systems have the ability to import information from external sources in order to manipulate it according to the processes and constructs of that system. Some systems have integrated even more categories of business information to provide more comprehensive tracking and business management capabilities for the users. For example, available "enterprise software" applications track not only accounting information, but also sales, inventory, pricing, shipping, and other information in a single, integrated environment.

The limitation of these systems is that information provided to these systems must be in a format that is recognizable and manipulable by the systems. In many instances, the information must be entered in a system specific environment in order to be recognized and processed by the system. Further, many of the more complex systems integrating various and previously disparate functions require the components of the systems to constantly monitor the information flowing through the system to determine whether that information is relevant to that component and therefore whether that component must then perform some function.

Many of these systems take the form of a hub and spoke network as seen in prior art FIG. 9. For example, an enterprise integration system could have a hub for routing information from one application to the others on the network. A hub contains multiple ports and is used to connect segments of the network. When an information packet arrives at one port, it is copied to the other ports so that all enterprise applications on the network can see all packets. A hub serves simply as a conduit for the data, enabling it to go from one application on the network to another. In this example, when an order is entered in the ordering interface application, the hub publishes the order to each of the other applications in the network. The accounting application monitoring the network may capture the order information transmitted by the hub to store it for future action. Upon receiving the order information, the inventory database application may reduce the inventory a corresponding quantity and publish the reduction to the hub. The accounting application, with receipt of the inventory publication from the hub, now knows that the order can be fulfilled and then uses the order information previously received to credit the ledger.

However, the shipping application may not be activated by the order information inherently received from the hub. Instead the shipping application waits for information from the inventory application before initiating shipping arrangements, because if there is no product in inventory there is nothing to ship. The shipping application may then publish shipping costs to the hub, which are transmitted to all applications do not need the shipping information received, the accounting application debits the shipping costs to the ledger when the shipping information is received to populate and maintain the business books. In a hub and spoke system, therefore, any information received at the hub is published to all other applications on the network, regardless of whether they have use for the information. The applications are in constant communication with the hub to monitor for relevant incoming information that indicates that they must take action. This constant publication and monitoring can result in bottlenecks in the network.

Another prior art system is a channel-based enterprise integration model as shown in prior art FIG. 10. An example using business process systems integrating accounting, ordering, shipping, and inventory modules is again depicted. In a channel model, instead of a hub operating to serve as a focal point for the distribution of incoming information, different applications subscribe to one or more channels to monitor for or to publish an event. For example, an event might be an "order entered" published by the ordering application to this channel. All other applications with an interest in an "order entered" event would subscribe to monitor that particular channel. For example, an inventory application would subscribe to the "order entered" channel in order to check the inventory database to ensure that the order entered is available in inventory. If the item ordered was available, the inventory application could publish to another channel called "fulfill order" to which a shipping application could be a subscriber. This can be a waste or significant resources in terms of processing power and bandwidth for communications. By creating specific channels for specific events, the channel model helps avoid the bottleneck drawback of the hub and spoke model. However, applications in the channel model must still maintain a constant connection with subscription channels to monitor for pertinent new information.

In a complex workflow system, it is desirable to integrate documents with data and information created by various applications, perhaps even operating on several different platforms. Integration of such documents in the complex workflow system may be difficult because the workflow system may not have the necessary components or applications for processing and interpreting the documents can be extremely time and resource consuming and a significant expense; in fact it may be never-ending. On the other hand, the information contained in such files could be very valuable to the complex workflow process.

A data-type-definition (DTD) or schema, preferably an extensible mark-up language (XML) schema, is contemplated for the consistent, dynamic exchange of complex services data via valid DTD encoded documents. These DTDs provided for documents can be global or industry specific depending upon the processes desired by any particular workflow system. The DTD execution language is preferably an XML-based tag set that defines business component instantiation, execution, input and output parameters, workflow, user profile, and collaboration specifications for a given task or data in a complex workflow process. A language execution broker identified by DTDs, and dispatches the documents and instructions to a processor selection component, for example, a dynamic plug-and-play (PNP) engine, for execution.

In order to integrate the information in such files into the complex workflow environment, an XML-driven dynamic business component instantiation and execution framework is created, enabling complex workflow and collaboration to occur over a communication network, for example, the Internet. Business and data processing components available on systems both within and outside the complex workflow system are called upon to provide the processing, interpretation, and transformation functions for the complex workflow system. The results of such processing are then returned to the complex workflow system for integration within the workflow process. In this way, the complex workflow system maintains a focus on the workflow process, rather than branching out into other tangential processing functions.

The PNP engine then executes the instructions in the DTD document by calling upon the necessary processing objects or components, either internal or external on third party processing systems. The PNP engine either calls a local object or routes the DTD document and instructions to an external application. The PNP engine also orchestrates the processing flow and collaboration with the external components as defined by the particular DTD document and instructions. The PNP engine preferably interfaces in an object-oriented environment such as objects, applications, and other components called upon by the PNP engine can be added, removed, or updated dynamically without affecting the functionality of the PNP engine.

BRIEF DESCRIPTION OF THE DRAWINGS

FIG. 3 is an exemplary representation of a preferred embodiment XML data-type definition document as used by the systems and processes of the present invention.

FIG. 3A is an example of a WellXML™ formatted document, in accordance with one embodiment of the invention.

DETAILED DESCRIPTION OF THE INVENTION

Figure 1:
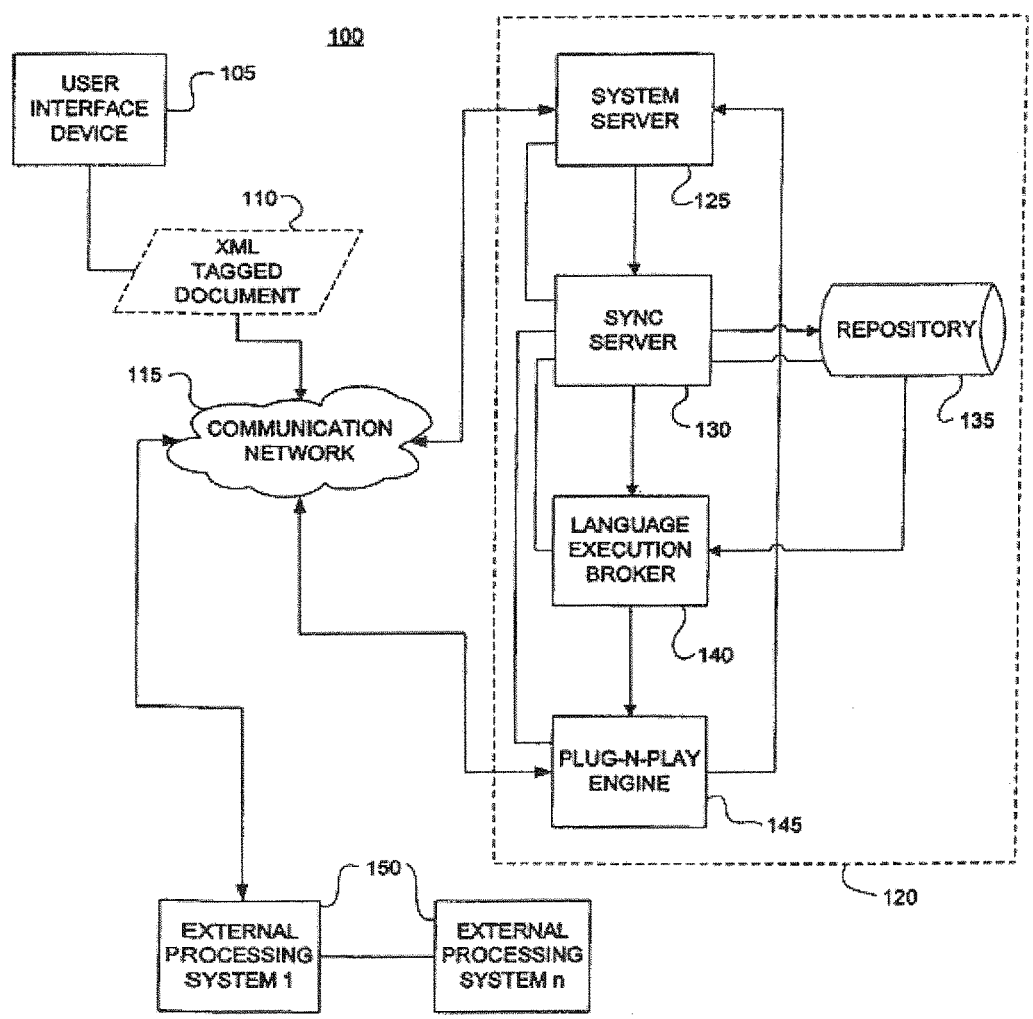
FIG. 1 is a flow diagram of the components of a framework for providing dynamic business component instantiation and execution in the present inventive system to process data and information in a complex workflow environment.

The interaction of the components of the dynamic DTD processing system 100 is shown in FIG. 1. A user initiates a connection with a complex workflow platform 120 over a communication network 115 through a user interface device 105. The communication network is preferably the Internet, but it can likewise be any other sort of communication network, for example, an intranet, an extranet, a local area network, a wide area network, a public network, and a private network. The users interfaces device 105 can be any sort of processor device with the ability to connect to the communication network and transmit data, for example, a personal computer or a computer workstation. The user interface device could also be a wireless device such as a personal digital assistant (PDA), a wireless telephone, a web pad, or other wireless device. If the user interface device 105 has the capacity to directly connect to the communication network, the transfer of information to the complex workflow platform 120 can be immediate. For example, the complex workflow may provide web-based templates and documents from its system server 125 for the user to directly access and populate with information via a web browser on the user interface device.

In other instances, the user may not be able to directly access the complex workflow platform and the transfer of information may be delayed. For example, a user with a PDA may work on browser-based documents while offline, using XML or other DTD-based browser generation and data storage processes instead of server-based. The information entered into these documents may be stored on the PDA as, for example, XML documents until the user has access to a network. The user than has two options: 1) to directly synchronize document information from the PDA over a connection with the communication network 115 with project or document information already residing on the system server 125; or 2) to first synchronize the information on the PDA with a desktop personal computer utilizing synchronization client software or any other appropriate application, and then to synchronize with the system server 125 from the desktop computer. The synchronization and transmission preferably takes place via secure socket layer connection between the user interface device 105 and the system server 125.

The data, information, object, application, relational data structure, or other file type (herein referred to individually as a "document" or collectively as "documents") prepared by a user and transmitted from the user interface device 105 is preferable tagged with DTD information. In the preferred embodiment the DTD language used is XML and the user transmitted documents referred to herein are XML tagged documents 110. An XML tagged document 110 can be generated within a client application correlative to the complex workflow platform 120 environment, or by any other application. An XML tagged document 110 may likewise be generated on the system server 125 within the complex workflow platform 120, for example, via user input into web-based templates resident on the system server 125. In a preferred embodiment the XML tags are taken from a particular set that defines business component instantiation and execution, input and output parameters, and workflow and collaboration specifications for a given complex workflow process. An XML tagged document 110 preferably has at minimum an "XML set" tag to identify the particular industry XML subset, and a "document type" tag that would be used to match the document with appropriate XML based processing instructions. Other sets of DTD language constructs may be used to tag documents for performance within the scope of this invention.

A specific instantiation of a preferred complex workflow platform 120 is the workflow system for the upstream oil and gas industry disclosed in two prior, related U.S. patent applications identified by Ser. No. 11/076,071 filed Mar. 8, 2005 entitled Process and System for Matching Buyers and Sellers of Goods and/or Services and Ser. No. 09/801,106 filed Mar. 6, 2004 entitled Method and Process for Providing Relevant Data, Comparing Proposal Alternatives, and Reconciling Proposals, Invoices, and Purchases Orders with Actual Costs in a Workflow Process. The XML tagged documents 110 in such an embodiment preferably adhere to a specific subset of XML to provide deep vertical integration within the oil and gas industry. Such an XML subset called WellXML has been proposed and developed by Wellogix, Inc. of Houston, Tex. An exemplary XML tagged document 110 using WellXML tags is shown in FIG. 3.

The XML tagged document 110 of FIG. 3 begins with a subset identification 300 of the particular XML subset in which the document is coded, in this case "WellXML." Additionally, a document type identifier 310 is present to provide the document type, which is generally industry and XML subset specific. The document type 310 is a minimal indication to the complex workflow platform of the process requirements for the document. In this example, the document type is "<dailyDrillingReport>." Other tags in the XML tagged document 110 include specific data types 320 ("<holeSummary>") and 324 ("<casingSummary>"), each of which further include multiple data fields 322 and 326 such as input parameters and others. The data types 320, 324 and data fields 322,326 provide additional information for use in processing the XML tagged document 110. A further XML tag may provide a user profile 340 ("<operational>") indicating information about the user that can be used to provide processing routines specific to that user. The data structure of the XML tagged document 110 may be thought of as an "envelope." The data transferred in the document is wrapped (or enveloped) in XML tags that identify the nature of the document, the identity of the sender, processing instructions, and an addressee for transmission; it further may contain return address information.

Returning to FIG. 1, the complex workflow platform 120 is composed of a system server 125 that interfaces with users via the communication network 115 to facilitate the transfer of documents and other data generated by a user at a user interface device 105. The complex workflow platform further preferably has a synchronization server 130 that constantly checks for incoming XML tagged documents 110 at the system server 125 and coordinates the processing of the documents 110 in the workflow platform 120. The synchronization server 130 may either pass the XML tagged document 110 to a predetermined holding repository 135 or forward the XML tagged document 110 directly to a language execution broker 140 upon reception. The XML tagged document 110 does not necessarily have to be placed in the repository 135, but such placement may be preferred if there is not an urgent need for processing the document or it is known that processing is not immediately possible.

The language execution broker 140 reads the tags on the XML tagged document 110 and, if necessary, provides additional information or instructions in order to ensure appropriate processing of the XML tagged document 110. The language execution broker 140 initially reads the "document type" 310 of the incoming XML tagged document 110, matches it with the appropriate XML-based processing instruction set, and forwards these two documents to the PNP engine 145 for processing. The XML-based processing set contains key processing information, for example: the name of the component, application, or software object (hereinafter collectively "component(s)") that processes the incoming document; the methods of that component that should be executed; the location of the component, either within the complex workflow platform 120 or accessible over the network 115; the input and output parameters for the particular component; and if more than one component is needed to process the incoming document, the processing set provided by the language execution broker 140 includes instructions for orchestrating the workflow between the components. Any additional instructions determined by the language execution broker are attached to the XML tagged document 110 as it is muted for additional processing.

With reference to the exemplary XML tagged document of FIG. 3, the functions of the language execution broker 140 can be further detailed. Again, in this example, the subset identification 300 is "WellXML" so the language execution broker 140 knows to look for processing instructions related only to the "WellXML" subset. The language execution broker next notes the document type 310, which in this example is "<dailyDrillingReport>." If certain standard processes are generally applied to a "(dailyDrillingReport)" document, the language execution broker 140 attaches these instructions. Also, if there are user profile tags 340 as part of the document, these may indicate to the language execution broker 140 that user specific processing components are desired and should be chosen over general components used for that document type 310 or data type 320,324. In addition to processes linked to the document type 310, the document further includes the data types 320 and 324 that the language execution broker may recognize as requiring additional specific processing components. In fact, based upon the data types 320 in a particular document, the process results for a first data type may be required by the methods of the component processing a second data type. In this case the instructions provided by the language execution broker may dictate an order for processing various document types 310 or data types 320 and 324, or the instructions may indicate that the process results for one data type be saved for use in future processing calls to other components. For example, the component processing the "<holesummary>" data type 320 may require process results from the component that processed the "<casingSummary>" data type 324. Therefore, the language execution broker 140 may instruct that the "<casingSummary>" data type 324 be processed first.

After the language execution broker 140 has matched the XML tagged document 110 with the appropriate XML, language processes, it then dispatches the document, along with the processing information, to the dynamic Plug and Play (PNP) engine 145 for execution. The PNP engine 145 executes the instructions in the XML tagged document 110, and in any further attachments thereto generated by the language execution broker 140, by dynamically calling upon the necessary business component found in either an internal component of the complex workflow platform 120 or an external processing system 150, and orchestrating the entire workflow and collaboration process as defined by the particular XML tagged document 110. The PNP engine can interface with numerous external processing systems 150 that have many and varied business component processes in order to appropriately process the XML tagged document 110 for use by the complex workflow system 120. The PNP engine 145 contacts the desired external processing systems 150 as needed and transmits the XML tagged document 110 and supporting instructions for processing.

The PMP engine 145 uses the XML-based processing instructions in its dynamic instantiation and execution of external processing systems 150. The PNP engine 145 makes the appropriate dynamic component calls depending upon the nature of the external processing system 150. For example, the PNP engine 145 can simply transmit the necessary information from the XML tagged document 110 and from any additional XML instructions as XML via hypertext transfer protocol (HTTP) if the external processing system 150 is a simple object access protocol (SOAP) enabled web service or related architecture. In this case the PNP engine 145 would contact the external processing system 150 by its uniform resource locator (URL) and request, using web services description language (WSDL), the data variables needed by the processing system 150 and the expected data type return after processing. Once this information is known the PNP engine 145 sends the appropriate XML tagged data to the URL for processing and provides a URL for return of the process result to the PNP engine 145.

Other methodologies for calling external processing systems into service may be used by the PNP engine 145. A second exemplary method is through dynamic Java® component instantiation using reflection- and introspection-based components. Briefly, this is a Java® construct wherein the PNP engine 145 asks an object about itself and the object returns information about the functions it performs, the input parameters it requires, and the output parameters it provides. This allows the PNP engine 145 to determine what data to provide to the object for processing. A third exemplary method is to use Java® native interface capabilities to similarly ask a non-Java® component (e.g., C, C++) how to instantiate itself and what input parameters it requires. A fourth exemplary method employs Java database connectivity (JDBC) to interface with all JDBC enabled databases. The connectivity protocol allows the PM' engine 145 access to a database to determine requirements for start procedures in the database, call methods, and input and output parameters. This method also allows for both structured query language (SQL) calls and access to stored procedures.

None of the external processing systems 150 needs to monitor the PMP engine 145 for data that they have the ability to process. Rather, the PMP engine 145 contacts only an external processing system 150 with desired business components, which is then instantiated for processing the XML. tagged documents 110. The XML tagged document 110 can therefore originate from any application or platform. However, with the identification of the XML tags, the PM' engine 145 can chose an appropriate internal component or external processing system 150 to process the XML tagged document 110 according to the instructions defined therein and provide resulting information, or the document itself, in a format that can be integrated into the workflow process of the complex workflow system 120.

Figure 2A:
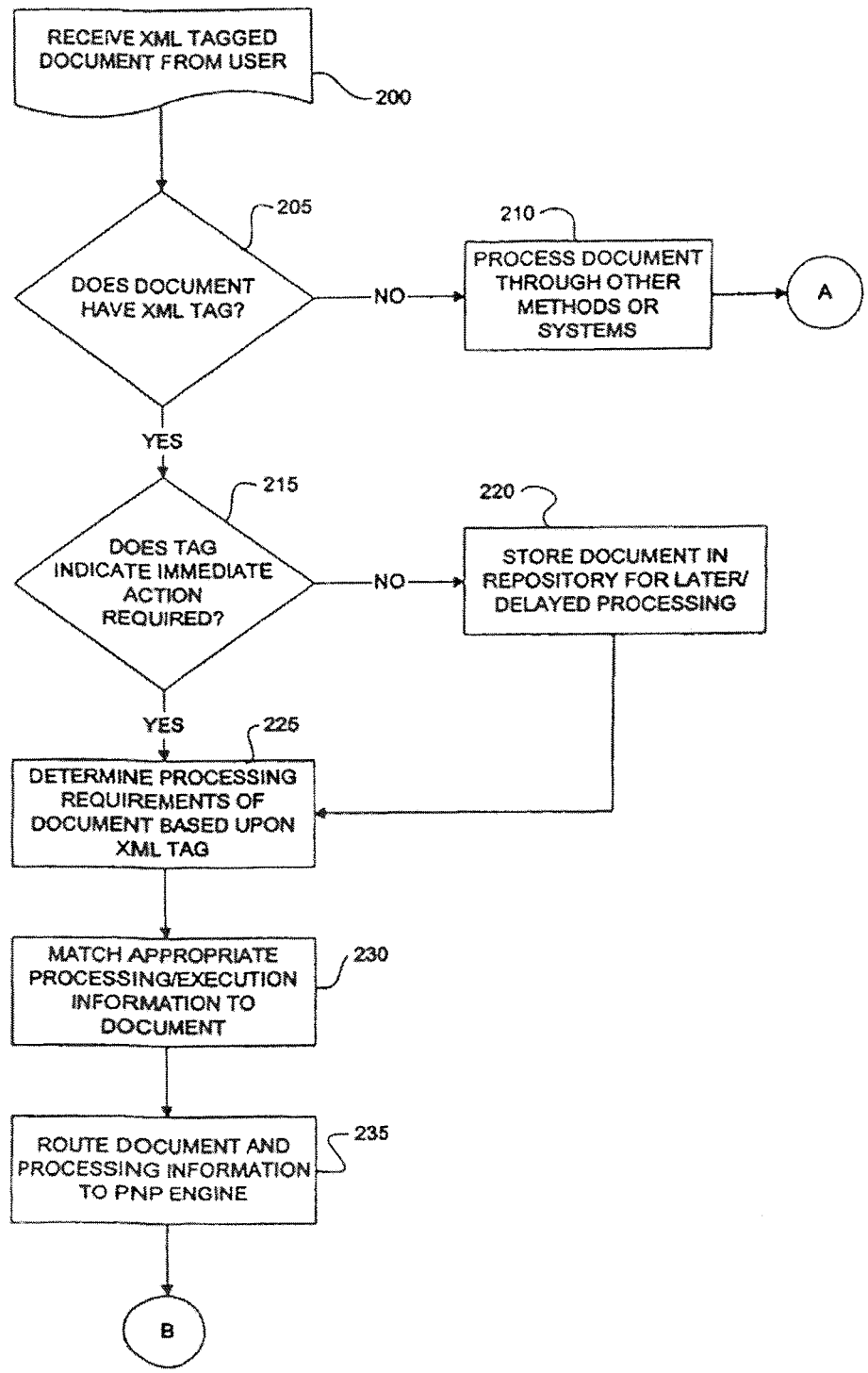
FIGS. 2A and 2B depict a flow diagram of the process implemented according to the present invention for routing and processing information.
Figure 2B:
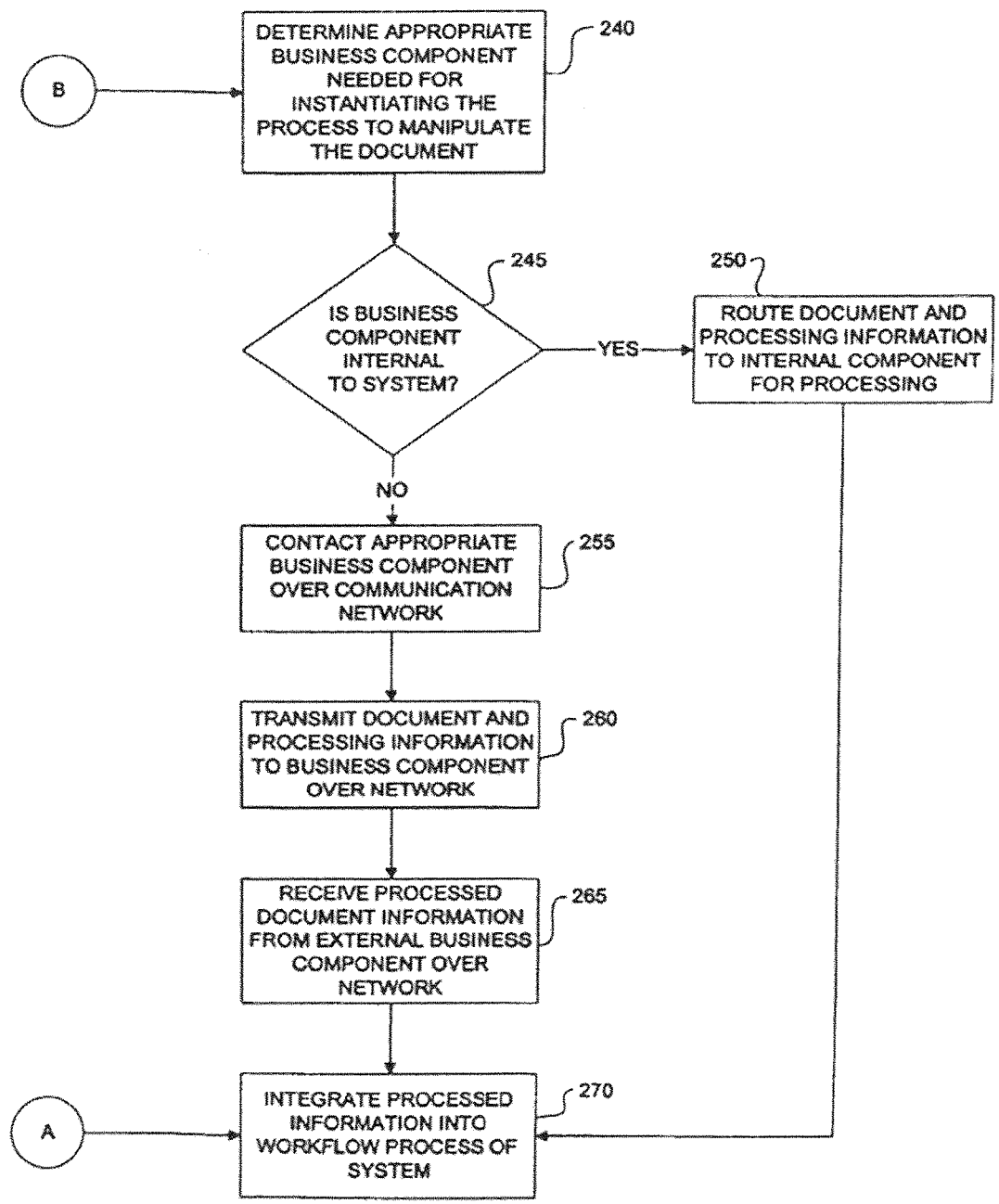

FIGS. 2A and 2B depict the routing and processing steps of the XML tagged document 110 through the dynamic DTD processing system 100. At step 200 the XML tagged document 110 is received at the system server 125. The synchronization server 130, which is constantly monitoring the data exchanges by the system server 125, determines whether an incoming document has an XML tag, step 205. If not, the document is processed through the normal functions of the complex workflow system 120, step 210, and integrated into the workflow process of the complex workflow system 120, step 270. If the document is determined by the synchronization server 130 to be an XML tagged document 110, the synchronization server 130 accesses the XML tagged document 110 from the system server and determines whether immediate processing is required, step 215. If it is determined that no immediate processing is necessary, the synchronization server 130 stores the XML tagged document 10 in a repository for delayed processing step 220.

If immediate processing of the XML tagged document 110 is necessary for the operation of the complex workflow system, or otherwise desired, or if it is appropriate for an XML tagged document 110 stored in the repository to be processed, the function moves to step 225. At step 225, the language execution broker 140, to which the XML tagged document 110 is passed by the synchronization server 130, determines the processing requirements of the XML tagged document 110 based upon the information provided about the document 110 in the XML tag. The language execution broker 140 attaches any necessary additional processing information for the XML tagged document 110 document, based upon the XML tags, step 230 and then mutes the XML tagged document 110 and any additional processing instructions, to the PMP engine 145, step 235.

The PNP engine 145 next determines the appropriate business component to instantiate to process the XML tagged document 110 according to the instructions provided in the XML tags, step 240. The PMP engine queries whether the appropriate business component is internal to the complex workflow system, step 245. If the complex workflow system has the ability to process the XML tagged document 110 document internally, the document 110 is routed within the complex workflow system 120 to the appropriate component for processing. Once processed, the document 110, or the information or data therein, is integrated into the workflow process of the complex workflow system 120, step 270.

If the XML tagged document 110 cannot be processed internally, the PNP engine 145 contacts an appropriate business component on an external system 150 to instantiate it for processing XML tagged document 110, step 255. The XML tagged document 110 is transmitted over the communication network 115 to the business component of the external processing system 150. Once the XML tagged document 110 has been processed by the chosen external processing system 150, the processed document 110 is returned to the PMP engine 145 over the communication network 115, step 265, and integrated into the workflow process of the complex workflow system 120, step 270.

Figure 4:
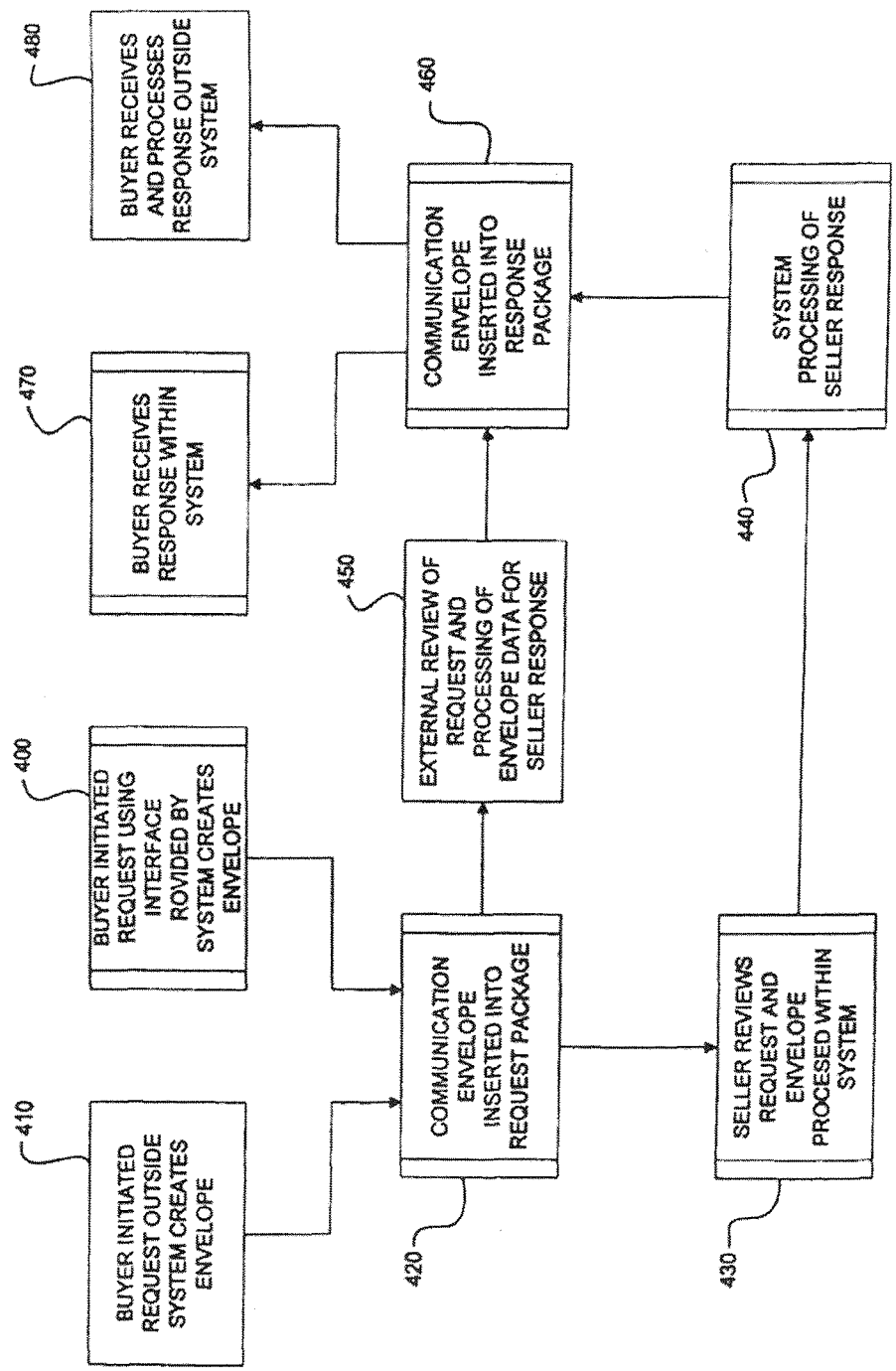
FIG. 4 is a relationship diagram depicting the relationship between process functions in a preferred embodiment applying the methods of the present invention.

In addition to providing for the dynamic instantiation of external components for processing data used by the dynamic DTD processing system 100, the methodologies disclosed also provide an ability for users who are not able to use the complex workflow platform 120, or who have documents that cannot be created within the complex workflow platform 120, to interface with other users. FIG. 4 shows various possibilities for users of the system in the preferred oil and gas industry embodiment, referenced previously, to interact through the assistance of the DTD dynamic processing system 100. In the preferred oil and gas embodiment, a buyer generally initiates a request for a quote from a seller of goods or services by preparing a request on the complex workflow platform 120 through an interface, block 400. In this case the DTD processing system 100 on the platform 120 tags the data and documents in the request and creates various XML communication envelopes. These communication envelopes are inserted into an entire request package for submission to a seller of the desired goods or services, block 420. There may be a situation, however, where the buyer is unable to enter his request directly through the platform 120, and instead creates a request for goods and services outside the platform, block 410. If the buyer appropriately tags the documents in the request with the industry specific DTD language subset to create communication envelopes recognizable by the system 100, the externally created envelopes can similarly be inserted into a request package for submission to a seller, block 420.

Normally then, the seller would be notified by the complex workflow platform 120 that a request is available for review, and the seller would review the data and documents in the request through the seller's interface with the platform 120, block 430. In this case as well, the communication envelopes in the request would be processed by the DTD dynamic processing system 100. Man alternative, if the seller is not part of the complex workflow platform, the communication envelopes may simply be passed by the platform 120 to the seller's external system for processing and review by the seller external to the platform 120. In this instance, the DTD dynamic processing system 100 might not actually process the envelopes for the seller, but merely route them to the seller for external processing, block 450.

A response by a seller to a request by a buyer is normally prepared within the complex workflow platform 120 via inputs from the seller through an interface, block 440. The DTD dynamic processing system 100 appropriately tags response documents and inserts the envelopes created into a response package made available to the buyer, block 460. 10 However, in the event the seller is external to the platform 120, the seller may still pass appropriately tagged documents to the platform 120, block 450, which will be recognized by the DTD dynamic processing system and inserted in to a response package to be made available to the buyer, block 460. Again, normally the buyer would be notified that a response to a request is available and review the response as processed by the DTD dynamic processing system 100 within the platform 120 through a user interface, block 470. However, in the event the buyer is external to the complex workflow platform 120, the response package may merely be routed to the buyer's external system for processing and review by the buyer system In this way, through the use of the tagged documents in communication envelopes, the workflow processes of the platform 120 are made accessible to a greater body of users. This may be desirable for users who, for example, would rather use their own, perhaps proprietary, processing systems to analyze the data and documents, but still want the opportunity to interface with other users through the complex workflow platform 120.

Figure 5:
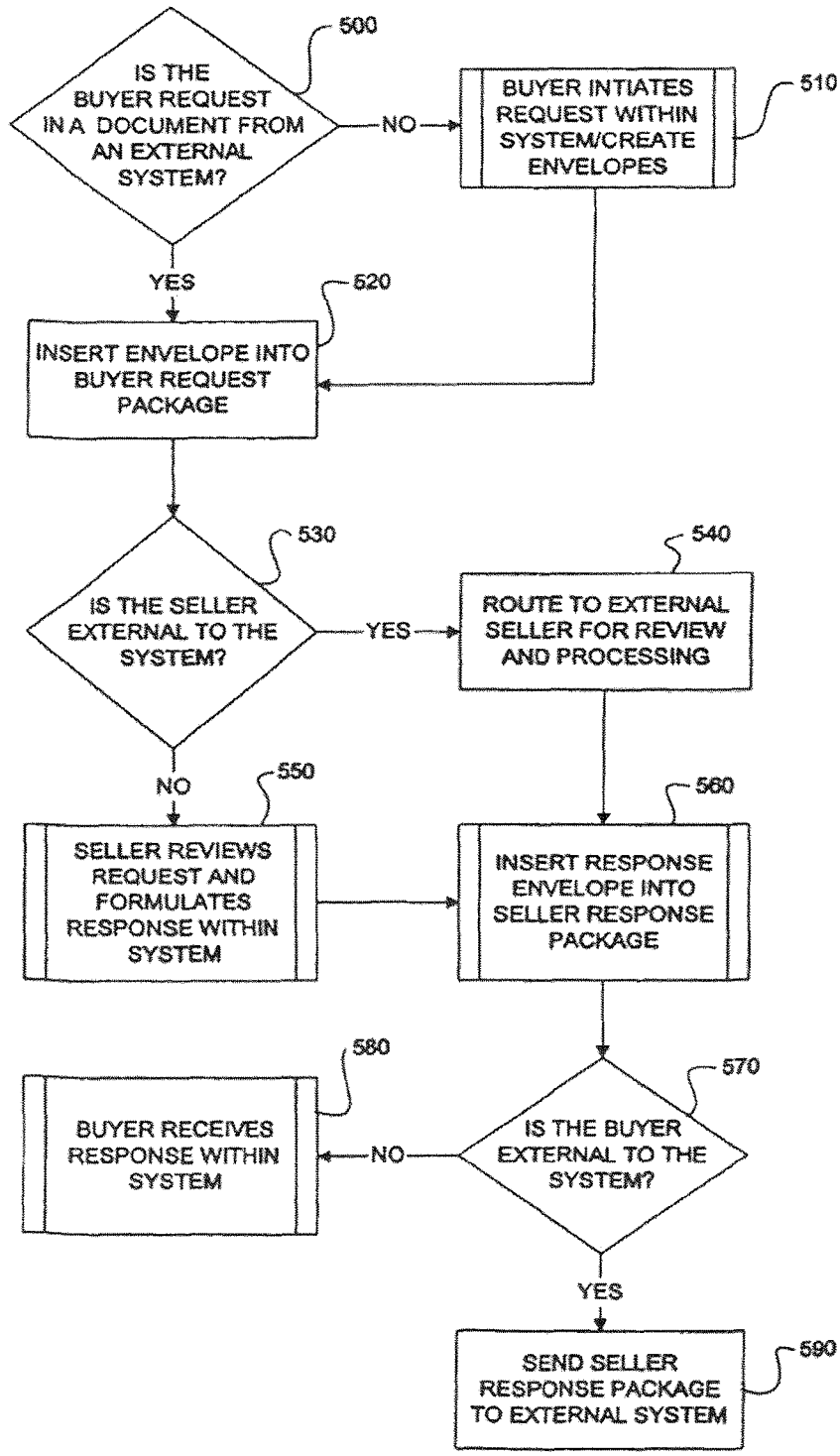
FIG. 5 is a logic diagram indicating the decisions made in determining the path to take between the functions of FIG. 4.

FIG. 5 is a logic flow for the routing performed between the process functions 25 described with reference to FIG. 4. The system 100 first determines whether the buyer request is originated external to the platform 120, step 500. If the request is external, the related envelopes are simply passed and inserted into the request package, step 520. If the request is originated within the platform 120, the DTD dynamic processing system 100 must tag the documents, step 510, to create the envelopes that are then inserted into the request package, step 520. The logic next determines whether a particular seller is external to the system, step 530, (e.g., the seller desires to perform its own document processing). If so, the request package is routed directly to the seller for external review and processing, step 540. If the seller interfaces with the platform 120 and uses its processing functions, the seller is notified of the request for review and response preparation within the DTD dynamic processing system 100, step 550.

Whether the response documents are prepared within the system 100 or on a seller's external system, the DTD dynamic processing system 100 inserts the prepared envelopes into a response package for provision to the buyer, step 560. The logic then queries whether the buyer is external to the platform 120, step 570. If not, the DTD dynamic processing system 100 processes the response package and the buyer reviews the response within the platform 120 via an interface, step 580. If the buyer is external to the platform 120, the system 100 recognizes that it need not perform any processing and merely routes the envelopes 10 comprising the response package to the buyer system for processing and review, step 590.

Although various embodiments of this invention have been described above with a certain degree of particularity, or with reference to one or more individual embodiments, those skilled in the art could make numerous alterations to the disclosed embodiments without departing from the spirit or scope of this invention. It is intended that all matter contained in the above description and shown in the accompanying drawings shall be interpreted as illustrative only of particular embodiments and not limiting. Changes in detail or structure maybe made without departing from the basic elements of the invention as defined in the following claims.

The present invention relates to the field of automated business management tools and methodologies. More specifically, the present invention relates to the field of managing information utilized in developing and administering complex projects and/or processes.

The present invention also relates to the field of automated business management tools and methodologies. More specifically, the present invention relates to the field of managing information utilized in developing and administering complex projects and/or processes.

Information for engineers, cross-functional teams, executives and other users to plan, administer, manage, and complete projects and processes is typically created in multiple software applications and maintained in files and locations that are inconvenient to utilize and/or access. Often such information, which, for example, may include well operations reports (for example, daily drilling reports, completion reports, work over reports, and activity logs/events), project parameters, scheduling information, technical specifications, change tracking, vendor/supplier relationship management and feedback, requests for quotes and proposals, requests for service, daily reports, performance reviews and more is often stored on paper in filing cabinets.

Such information often may not be readily accessible to team members and others because of its format, storage location, identification and accessing schemes (i.e., how the information is filed in the cabinets, identified and then retrieved for review). With the advent of computerized filing systems, such information has been relocated from the physical file cabinets of the past to the virtual file cabinets of the present (which are suitably hosted on electronic and computer based client-server databases and systems). However, the difficulties inherent in identifying, accessing and retrieving such information (whether physically or virtually stored) have not been overcome and instead have been shifted from physical searching to virtual searching.

Further, current systems and processes do not provide the needed capabilities to mine such information, after it has been identified and retrieved, in a convenient, easily accessible and beneficial manner. Thus, there is a need for systems and processes which enable users to quickly and efficiently access, manipulate, utilize, and exploit information concerning projects, operations and processes on a real-time basis.

Further, current systems and processes do not enable users to quickly, and/or on a real-time basis, document the performance of a project or operation with which they are involved (for example, the status of an oil well drilling project). In short, current systems do not enable users to document project details "on the fly." Similarly, access to historic project information (e.g., for a past and similar well drilling project in the area) is often problematic and does not allow users to quickly obtain the historic performance and/or operational parameter information which may be of value to the user and ultimately the success of the project. Further, a system which allows such users to access the information and present/reformat the information in a useful/desired format (for example, in a graphical format) is needed.

Additionally, a system is needed which reduces the amount of time necessary to plan complex projects. In the oil and gas industry, for example, engineers often spend considerable time researching well files when planning to conduct operations on existing wells and/or developing new wells. For example, when planning a new well, an engineer will often research well files of "offset" wells to determine the costs, time to perform, and the hazards experienced during operations. This information is commonly accessed via paper or electronic files without any expert systems assistance. The information accessed is then used to plan a new well in hopes of minimizing the risks associated with the new well. Such information is then commonly only accessible by researching an existing well's file and does not provide readily accessible information on similarly situated projects. Thus, a need exists for a knowledge management system which enables users to research, identify and utilize information from like projects and not just from those projects with which they already know about or have to conduct an extensive search in or to so identify.

It is against this background that various embodiments of the present invention were developed.

According to one embodiment of the invention, disclosed herein is a system and process which provides engineers, cross-functional teams, executives and other users with the ability to document and exploit a company's operations and performance details for a project, operation or process in real-time from anywhere in the world over the Internet or a similar network. In one example, the present invention provides a foundation for an intelligent electronic filing system and process which may be utilized, for example, to obtain and provide information on an oil and gas well project.

In one embodiment in the context of the oil and gas industry, the system may provide a well repository (i.e., a database containing information relating to at least one well) as part of an intelligent electronic knowledge management system. As described further herein below, in one embodiment the well repository integrates various pieces of data and information received by a centralized, integrated web-based data application system.

According to one broad aspect of another embodiment of the invention, disclosed herein is a method for converting an extensive markup language (XML) file, such as a WellXML™ file, to data elements accessible by a server. In one example, the method includes receiving an XML file, determining the type of data provided in the XML file, and identifying at least one metafile associated with the type of data determined by the determining operation, wherein the metafile specifies one or more parameters present in the type of date determined by the determining operation. One or more data elements in the XML file are identified as corresponding to the one or more parameters, and an output file is generated which includes the one or more data elements. The output file may be stored on a server accessibley clients in a network. In this manner, a large number of files are converted into XML or the lie can be made accessible over a network.

In an oil and gas embodiment, the present invention enables Engineers and Managers to extract, utilize and present such information pertaining to the exploration, discovery, development and exploitation of oil and gas resources. In one embodiment, such information is provided in a usable format so that timely and intelligent decisions can be made which have a positive influence upon the exploitation of natural resources and especially the development and/or operational performance of current and future wells. In one example, a robust, secure, centralized, web-based database and infrastructure may be provided and can be accessed from anywhere at anytime.

Further, the repository of information may contain operational parameters associated with wells (or other projects/processes) which may be utilized to determine Which operational procedures and policies work or do not work for an industry, a specific company, a region, a project or any other level. Comparisons and analytical analyses can be conducted using the system at any time or stage of a process, project or operation from any authorised user. The information necessary to perform such analysis is preferably captured via a secure, centralized well repository structure, in one example. Further, the tools, business rules, operations, engineering rules, procedures and policies necessary to analyze such information may be provided and can be accessed from a suitably equipped system.

It is to be appreciated that various types of information may be suitably received by the system including, for example, work flow information collected by the Wellogix® system navigator on its navigator/Dynamaps™ function, operational data stores (for example, information provided by Landmark Graphics Drilling Information Management System (DIMS) application), and back-office financial systems (for example, SAP via Vitria's™ enterprise integration capabilities). Such information may be provided in an Extendible Markup Language (XML) format such as WellXML™ format or suitably converted into such format. WellXML™ is a subset of XML which is tailored for the oil and gas industry, and provides a flexible and comprehensive interfacing scheme for data structures used to facilitate the transfer of information associated with complex engineering services, drilling related functions between homogeneous and heterogeneous application systems.

Upon receiving such information, such as in the WellXML™ format, the system in one example integrates this information and other information as desired into a database that may be exploited by authorized users for business intelligence purposes, for example, presenting tables and graphs of a well configuration and operational performance thereof, determining the effectiveness of current processes, analyzing results of project strategies, isolating trouble areas, and locating sufficient resources. Other examples include True Vertical Depth versus Vertical Section reports, trouble time versus whole sections reports, and others.

Various embodiments of the present invention may be embodied as computer program products including a computer usable medium and computer readable code embodied on the computer usable medium, the computer readable code including computer readable program code devices configured to cause the computer to perform or effect one or more of the operations described herein.

The features, utilities and advantages of various embodiments of the invention will be apparent from the following more particular description of embodiments of the invention as illustrated in the accompanying drawings.

Figure 6:
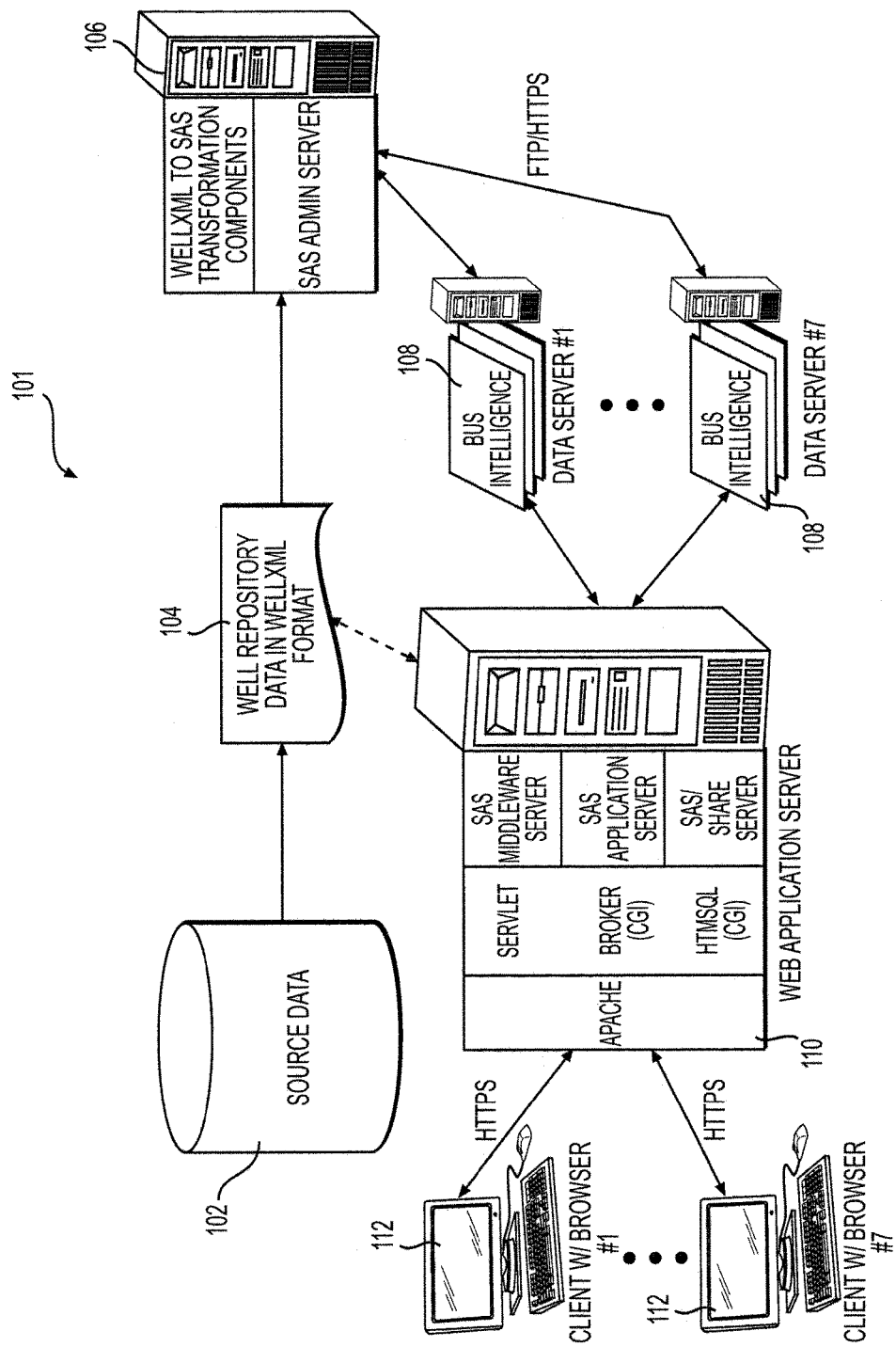
FIG. 6 is a schematic representation of a system in accordance with one embodiment of the invention.

As shown in FIG. 6, in one embodiment the system 100 includes various data entry devices, interfaces, and servers. As shown, source data 102 (for example, daily reports for well drilling information) is suitably input into an instantiation of the web application server 110 which accepts inputted source data from a client, for example, via a web browser over an Internet connection. One example of such a server 110 is as provided by a Wellogix® system which may be accessed via the URL www.wellogix.com. Another embodiment of such a web based data application system is further described in co-pending U.S. patent application Ser. No. 11/076,071 entitled "Process and System for Matching Buyers and Sellers of Goods and/or Services," filed on Mar. 8, 2005 the contents of which are herein incorporated by reference.

Further, the disclosures of the following co-pending U.S. patent applications are also incorporated by reference in their entirety: U.S. patent application Ser. No. 09/801,016 filed on Mar. 6, 2001 entitled "Method and Process for Providing Relevant Data, Comparing Proposal Alternatives, and Reconciling Proposals, Invoices, and Purchase Orders with Actual Costs in a Workflow Process"; and U.S. Provisional Patent Application Ser. No. 60/283,701 filed on Apr. 12, 2001, entitled "Data-Type Definition Driven Dynamic Business Component Instantiation and Execution" along with its corresponding non-provisional application filed on Apr. 12, 2002, Ser. No. 10/121,310.

The tools, business rules, operations, engineering rules, procedures and policies, such as described in the patent application entitled "System and Method for Developing Rules Utilized in a Knowledge Management System," referenced above, may be used to analyze such information and can be accessed from a suitably equipped system.

The server 110 suitably converts the received data from data source 102 into formatted documents, such as in one example WellXML™ documents which are an implementation of XML.

In one embodiment, the WellXML™ data includes at least two elements: an envelope and informational data. The envelope functions as a wrap on the informational data and preferably provides an indication of a type of data contained therein, the source of the data, the destination of the data (provided, for example, if the data is not to be saved in servers associated with the source) and any other identification and/or routing information necessary. The informational data provides specific parameters associated with a process, routine, request, job, or the like.

The source data 102 may include well planning data as well as information extracted from other reports and information conveyance vehicles, in one example. Examples of the types of source data 102 which the system 100 may receive and process may include: operational reports provided during the lifetime of a well; daily drilling reports; directional surveys which show the profile of a well; time and cost parameters (including trouble time and trouble encountered); drill bit performance parameters; health, safety, and environmental information; completion reports; time and cost parameters; stimulation reports; perforating reports; and wireline reports. The patent application entitled "Method and Automated Process for Marching Buyers and Sellers of Goods and/or Services," referenced above, describes one embodiment of a system for inputting, saving, manipulating and accessing such information.

It is to be appreciated that the present invention is not limited to using source data 102 provided only by and/or in conjunction with the Wellogix® system and/or an oil and gas embodiment. Other data may be utilized as desired from any source via any information conveyance vehicle, medium or methodology as particular applications of the system and process of the present invention require.

Once the information 102 is received, the system 100 temporarily stores the information 104 (which has preferably been converted in the WellXML™ format) in tables or views internal to a server 106, such as a SAS warehouse administration server. A SAS warehouse administrator is a tool developed by SAS Institute, Inc. and may use the WellXML™ data definitions to generate or retrieve program files used to create a well repository. In one embodiment, the server 106 suitably converts the WellXML™ formatted data into components, such as SAS transformation components. Such components may include operational data components, such as Operational Data Definitions (ODD) which may be used as inputs to data stores. The ODD represents an archive of original operational data, which may be untransformed from its original legacy format. In one example, ODD components are not used with direct data warehouse querying because ODD components are not in a final format which is quality assured, or because they are too voluminous to be kept in an on-line relational database.

Figure 8:
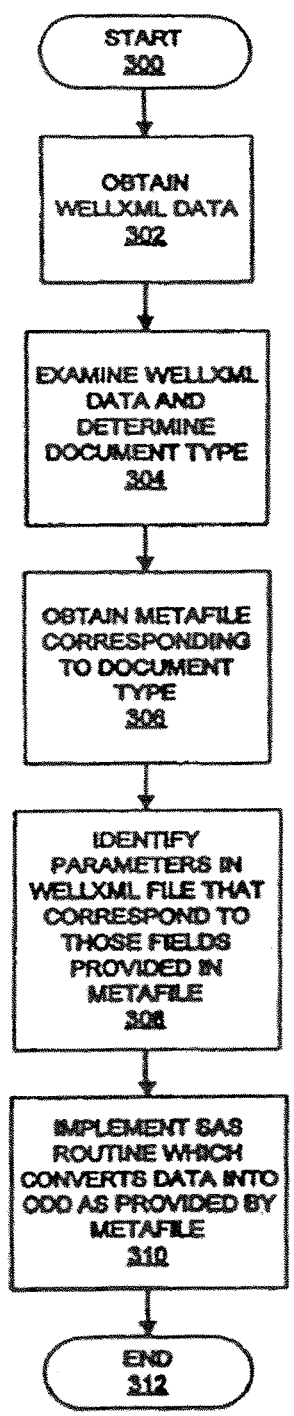
FIG. 8 is a flow diagram of a process utilized by a server to convert WellXML™ formatted data into Object Data Definitions (ODD), in accordance with one embodiment of the invention.
Figure 9:
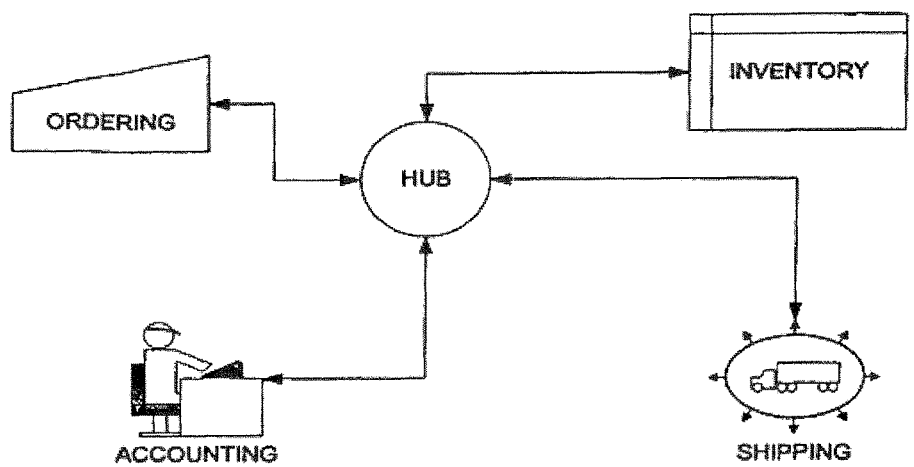
FIG. 9 is a prior art diagram of exemplary components of a hub and spoke business component integration system.
Figure 10:
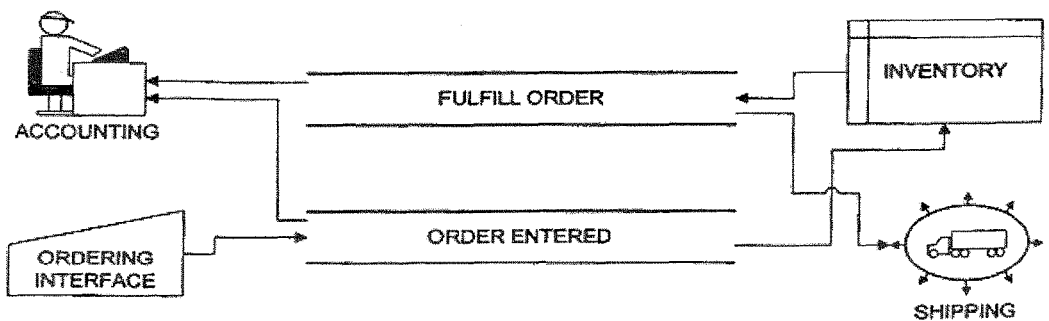
FIG. 10 is a prior art diagram of exemplary components of a channel linked business component integration system.

More specifically, FIG. 8 illustrates the process by which WellXML™ formatted data files are converted into components or data elements, such as ODD data, by the server 106 for storage on a data server 108, such as a client server in accordance with one embodiment of the present invention. As shown in FIG. 8, a process begins with obtaining or receiving a WellXML™ formatted data file (step 302). It is to be appreciated that in one embodiment, a WellXML™ formatted data file is provided to the server 106, however, such data may also be obtained upon request of the server 106, for example, when a processing routine being implemented on the web application server 110 requires data that has not been provided and suitably requests the data from a server where the data is known to be stored or provided.

An example of an XML tagged document 410 using WellXML™ tags is shown in FIG. 3A. The XML tagged document 410 of FIG. 3A begins with a subset identification 400 of the particular XML subset in which the document is coded, in this case "WellXML™" Additionally, a document type identifier 410 is present to provide the document type, which is generally industry and XML subset specific. In one example, the document type 410 is a minimal indication to the complex workflow platform of the process requirements for the document. In the example of FIG. 3A, the document type is "dailyDrillingReport." Other tags in the XML tagged document 410 include specific data types 420 ("holeSummary") and 424 ("casingSummary"), each of which further include multiple data fields 422 and 426 such as input parameter and others. The data types 420,424 and data fields 422, 426 provide additional information for use in processing the XML tagged document 410. A further XML tag may provide a user profile 340 ("operational") indicating information about the user that can be used to provide processing routines specific to that user. The data structure of the XML tagged document 410 may be thought of as an "envelope." The data transferred in the document is wrapped (or enveloped) in XML tags that identify the nature of the document, the identity of the sender, processing instructions, an addressee for transmission, and possibly return address information.

Referring again to FIG. 3, after receiving the WellXML™ data, the processing continues with the server 106 examining the WellXML™ data and determining a document type, i.e., the type of documents to which the data relates (step 304). This document type analysis preferably entails examining header information and/or addressing information provided in conjunction with the WellXML™ data. For example, a WellXML™ file conveying information about a cementing job for Oil Company X, the type of data as cementing, and the informational data might contain an estimate of how many metric tons of cement are specified.

After the server 106 determines the type of data provided in the WellXML™ data file, the server 106 then retrieves a metafile associated with the specific (or in some cases, general) type of data provided (step 306). A metafile may contain various instructions or rules which instruct a server on how to handle and/or manipulate data. In one embodiment of the system, metafiles are suitably created for each type of WellXML™ data received and are accessed as needed. Such metafiles may be stored with the server 106 or elsewhere, and accessed using common protocols and techniques. Upon obtaining the metafile associated with the document type, the server 106 then identifies those parameters in the WellXML™ data file which correspond to those specified in the metafile (step 308). Then the server 106 converts the WellXML™ data into components or data elements, such as ODD information formats, and sends the data to the appropriate data server 108 for storage (step 310).

Additionally, in order to convert the WellXML™ data files 104 into the various ODD transformation components, the server 106 may also validate the information. In one embodiment, validation occurs for three aspects of the information: form, type, and logical. Form validation is the act of mapping the incoming data stream and trying to interpret it into a known data definition. As mentioned previously, the server 106 utilizes specific data maps (i.e., metafiles) to map the data. Such data maps are preferably WellXML™ documents that describe the structure of the Well Repository tables (i.e., the ODD tables) including, for example, table names, column names, column lengths, column valid values and validation rules. These tables are used to store well planning, daily drilling and other information (i.e., source data 102) in the data servers 108. For example, well planning and drilling report maps may be prepared by a drilling engineer for a specific basin and/or region. Such maps are suitably indexed and classified such that, based upon the information 104 received, the server 106 can determine from which other data servers a needed map is to be obtained as necessary.

The server 106 may also perform Type validation, in one embodiment. Type validation is the act of determining whether the data elements are of the correct type. For example, based on the business rules utilized by a specific company (i.e., a client), the size of the drill bit can be specified in the map as a numeric property which is required for all valid drill bit records. During the parsing phase of the WellXML™ document, if the size of the drill bit is not provided and/or the provided size is not numeric, then the associated record fails validation and is preferably placed in an exception file for investigation.

Additionally, the server 106 may also perform logical validation of the received data file 104. During theological validation phase, the server 106 checks the meaning of specific data fields and their inter-dependencies, to assess logical correctness. For example, a WellXML™ data file 104 containing information relating to a cementing job would verify that the parameters provided relate to cementing and not to some other process, for example, mudding. In one example, such validation is accomplished using look-up tables, matching routines and other filtering/searching tasks.

Further, it is to be appreciated that server 106, as necessary, may also accomplish various additionally validations. Such validations may include, for example, authenticity (i.e., validating the source and/or communications links utilized to provide the information), currency (i.e., making sure only current and relevant information will be utilized by the system 100, for example, information provided by erroneous processes or reports may be deleted form the server 106), and other checks. As such, server 106 may accomplish any validations necessary and/or desired. Further, such validations may be accomplished solely by server 106 or by using routines, processes, results, and/or information provided by other servers and systems as necessary.

Once the information 104 has been validated, the server 106 converts the information into the ODD format expected by the specific users of the information. In an oil and gas embodiment, such information is appropriately transformed into well repository information files saved as ODDs on the specified data server 108 or a generic data server 108 when one is not specified. Large organizations may desire to store their data on a server which is not accessible by other clients, whereas smaller organizations may utilize a common server in order to reduce operating costs. Embodiments of the present invention may support may desired dedicated and/or shared server embodiment.

In one embodiment, the validated and transformed data in ODDs are loaded into corresponding tables in the one or more servers 108, which in one example may be well repository detail data servers specific to each customer. Such loading is preferably accomplished using FTP or HTTP, both of which are well known in the art. Once the ODD data is loaded into data server 108, additional rules based processing may be accomplished using the web application server 110 and the stored ODD data. However, in order to know where and what type of information is contained in an ODD data file on the data server 108, the web application server 110 suitably utilizes any metafiles which describe how the WellXML™ information was converted into the ODD. Thus, the web application server 110 and server 106 may share the metafiles as necessary to process the WellXML™ and ODD data files.

Upon identifying, via the appropriate metafile, how the ODD data is organized, the web application server 110 suitably accesses such ODD files and performs the desired processing specified by a client or automatically (for example, reports generated on a periodic basis). The ODD information may also be sent to data marts or a collection of databases which represent summarization of the information provided in a given set of ODD files, which may have been filtered by the customer. Mining may be accomplished by identifying patterns in the ODD files, such as patterns related to times to perform a given tasks, true vertical depth information, and other information.

The web application server 110 also may create various output documents, as determined by the client, the system administrator and the particular application of the system. Such output documents preferably utilize, in whole or in part, the information supplied and converted by server 106 into the ODD components and saved on the data servers 108. Examples of such documents include:

Configuration Documents Wellbore Schematic (i.e., changes during a lifetime of a well); Directional Surveys (i.e., sidetracks, multilateral extensions, etc.);

Regulatory Documents Permitting Documents; Sundry Notices;

HSE Records Accident reports; Spillage reports; and Environmental cleanup reports. It is appreciated that other various graphs, charts, reports and other documents may be generated by the system 101 or server 110.

Using the information and other information (for example, information already saved in the system or provided by third parties), the system 101 can conduct various comparisons and analytics using, for example, Wellogix's Internet based analytic tools or other tools to determine what operational procedures and policies work well or do not work well within an operational organization. The system provides the results of such comparisons and analyses to other programs and systems (which may be included as part or sub-system of the system 101) which can determine which processes or activities are desirable so that business rules can be generated to produce optimal work procedures and policies. In one embodiment, the present invention provides such features by utilizing rule based expert systems that allow for the customization of a company's business, operations, and engineering rules, for example, as described in the co-pending application entitled "System And Method for Developing Rules Utilized In A knowledge Management System" reference above.

Further, in one embodiment, the system may be designed in accordance with the J2EE industry standard. As is well known in the art, J2EE is an industry standard API for building scalable, secure applications. Leading J2EE application servers in the market today offer built in features like clustering, security, database connection pooling, object pooling, etc., which are proven techniques for scalability and performance. Additionally, in one embodiment the system utilizes Java Server Pages (JSPs) that are designed in a modularized basis such that additional modules may be added and/or deleted depending on particular need of particular implementations of the present invention. Java servlets are also used to enhance the HTTP request-response process. Such servlets preferably use SAS Web AF's, Information Beans and Middleware servers, all of which are well known in the part, to access data in multi-dimensional stores on the data servers 106 and 110. The Information beans may be Java beans components developed by SAS for accessing data. Also, a SAS Middleware server, provided by the SAS Institute, Inc., may be used so that SAS sessions may be shared amongst multiple users and other features may be provided such as connection aching, load balancing and remote access of SAS applications. Further, Vitria middleware server may be used to integrate the system with other enterprise application systems. It is to be appreciated that other application programs, interfacing software and/or protocols may also be utilized by the present invention as necessary. As such, the present invention is not limited to these configurations and may utilize other configurations as particular needs require.

Further in one embodiment, the system architecture utilized is suitably scalable by utilizing a clustering approach, wherein the web, business and integration logic tiers are horizontally replicated. Horizontal replication provides failover capabilities at the web/application tier. The horizontal replication of these and other components of the system architecture enable the client requests to be distributed amongst any one of the replicated legs, thereby ensuring the system is robust and that multiple tasks and information requests can be simultaneously processed. In one example, each leg within the replicated architecture hosts all logical tiers organized in the same physical tiering model. As such, communications between replicated servers is not needed to satisfy an ordinary business request. Since architectural subsystems that provide clustering, central logging and other functions may need to communicate across the replicated legs, the presentation tiers may be clustered and made know to each other.

Further, the system 101 may utilize an Application Server Provider (ASP) model, wherein a single company hosts data and applications for one or more clients. Clients' data are segregated utilizing well known data segregation systems and applications, such that the system 101, in one example, appears to users as multiple separate data marts or collections of databases, wherein each mart contains a user's separate information, some of which may be proprietary.

Users preferably access the system 101 via a suitable Internet connection. However, other network connections may also be utilized as well as providing the system 101 as a stand-alone application. In one embodiment, the service is accessed via a Wellogix portal, an example of which is described in the co-pending patent application entitled "Method and Automated Process for Matching Buyers and Sellers of Goods and/or Services," referenced above.

Further, a user-to-system web interface (i.e., portal) may be designed to enable personalization of the user experience. As such, the interface recognizes the results of user authentication sent by the portal and manages access to application components based on a customizable user profile, in one example.

As discussed previously, the system 101 in one example may be configured as a multi-tiered application. As is well known in the art, multi-tiered applications utilize an architecture structure that addresses the concerns of scalability, securing, volatility and control. The multi-tiered architecture utilized by the system 101 improves system scalability by allocating the correct among of resources (CPU, memory) to different parts of the system on an as needed/requested basis.

Similarly, the multi-tiered architecture also provides enhanced security capabilities by utilizing presentation codes, which are suitably distributed to client machines/web servers when such client machines/servers are located in less secure environments (for example, an oil drilling platform). This architecture further provides for business logic and business data to be kept behind firewalls on more secure machines, instead of being readily accessible from any machine/server connected to the system. Similarly, system maintainability and reliability is enhanced by the system architecture. The multi-tiered approach allows for sensitive software/data to be separated from non-sensitive software/data.

Figure 7:
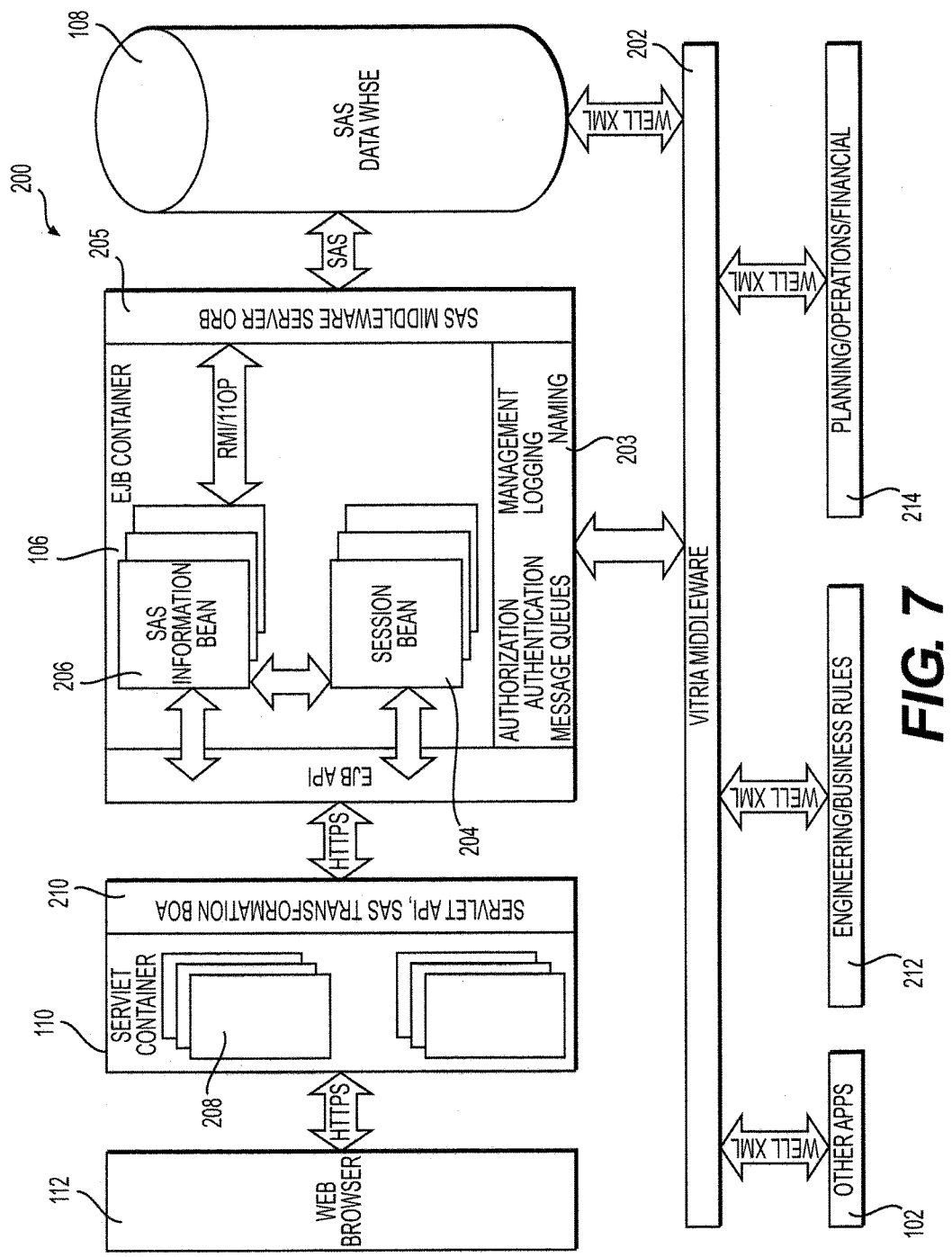
FIG. 7 is a schematic representation of a system architecture in accordance with one embodiment of the invention.

One example of a schematic representation of an embodiment of a system architecture is shown in FIG. 7. As shown, the system 200 may utilize Vitria middleware 202 to facilitate communications between server 106, information sources 102 (such as in the WellXML™ data format 104), and data servers 108 (for example, those providing engineering/business rules and/or planning/operations/financial information and rules). As stated previously, such data interchanges may be accomplished using a WellXML™ format between the source data 102 and server 106. In one example, an ODD data format is utilized between server 106 and the data servers 108 and with the web application server 110. Further, various other data formats may be utilized to provide engineering, business, financial, planning and/or operational rules 212/214 web application server 110. The generation of those rules 212/214 desired automate to automate the processes of the system 101 is further described in the co-pending patent application entitled "System and Method for Developing Rules Utilized in a Knowledge Management System," referenced above.

Further, in one embodiment, the architecture utilizes management software 203 (to control authorizations, management, system logging, message queues and other common functions), session beans 204 and SAS information beans 206. An Enterprise Java Bean (EJB) (i.e., a component model of J2EE) Application Program Interface (API) may be utilized to connect server 106 with the web application server 110 (for example, the Wellogix server) directly or via the data server 108. File transfers between server 106 and the web application server 110 may be accomplished using HTTPs. Those skilled in the art appreciate the various types, forms, throughput and data formats that may be supported using an HTTP transport protocol. However, other transport protocols, including FTP, may be utilized. Similarly, a SAS middleware server Object Request Broker (ORB) 205 may be utilized to interface server 106 with the data servers 108 and/or other databases as necessary.

In one embodiment, the web application server 110 suitably utilizes servlets 208. One servlet for each user session may be provided by the server 110, thereby ensuring data integrity. A servlet-SAS API transformation bean 210 may be utilized by the web application server 110 to complete the communications interface with server 106.

In one embodiment, a web browser 112 is preferably utilized as the user interface. However, APIs may also be utilized in conjunction with or without a web browser, depending in the particular implementation. Those skilled in the art appreciate that web browsers, MicroMedia™ Flash applications, APIs and other interfacing schemes may be utilized as well.

In one embodiment, the user interfaces with the system are web-based, and driven by Java Server Pages (JSPs) and Servlets that utilize a JSP "model 2" framework to separate request processing code from page layout views. This configuration, (i.e., by removing the Java from a JSP) increased the possibility of editing the JSP with a visual tool.

Further, the user interface may also provide client side validation of user-generated input. As is commonly known, one common difficulty with Internet enabled applications is the potential for a significant dependency on the use of JavaScript for client side validation, navigation, and presentation. If a significant portion of the business logic is nested within the JavaScript such that the Document Object Model (DOM) implementations between various browsers are different, minor changes in browser versions may result in different behavior between browser types. This can often result in JavaScript having multiple switch-like statements to determine which browser is being used and how to handle that client. This results in JavaScript that constantly battles new releases of the various browsers since each handles complex behavior differently. To alleviate and/or reduce these difficulties, the system may utilize the general concepts that are common between all versions of DOMs (for example, null and length checking of user form input). However, to avoid the additional workload on the server to handle the validation steps, the system may limit the use of client side JavaScript to the following conditions, in one embodiment:

1. Null field enforcement: prevents submit if required field is not entered;

2. Coupled null field enforcement: prevents submit if one field mandates the entry of another. For example, it may be required that when entering an address line in a user profile, it is required that a zip code must also be entered before submittal; and 3. Length checking of input. For example, if a username must be greater than 6 characters and less than 10, this could be client side.

The system may be configured to perform all other validations using Java, either within the servlet interaction framework or at the bean level, i.e., within the web server/application server.

In one embodiment, the system 101 may be implemented using a Sun® computer workstation running Solaris 8 software as the operating system on the database server, server 106 and Web application server 110. Software modules may also be utilized by the database server including, but not limited to, SAS Data Warehouse, SAS/Warehouse Administrator, SAS Integration Technologies, SAS/ACCESS, and SAS Connect. Similarly, server 106 may utilize Bas SAS, SAS/CONNECT, SAS/GRAPH, SAS/SHARE, SAS Enterprise Reporter, and SAS/INTERNET. The web server 110 may utilize Oracle 9iAS. The client devices may be configured using Microsoft Windows2000® or the like and a suitable web browser (for example, MS Internet Explorer 5 or Netscape Communicator 4.5). However, other hardware and software may be utilized by embodiments of the present invention to provide one or more of the features and functions identified herein.

While embodiments of the present invention have been shown and described with reference to the oil and gas industry, it is to be appreciated that embodiments of the present invention are not limited to any one or more specific systems, methodologies, applications, environments, projects, or embodiments and may be utilized, as desired, to provide access to real-time information concerning the scope and/or status of a project via any Internet or other suitable communications connection. Examples of other project fields for which embodiments of the present invention may be utilized include, but are not limited to, construction projects, aircraft (or similar equipment) manufacturing, and/or any other activity or process which is of a complex nature.

While the methods disclosed herein have been described as shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

While the invention has been particularly shown and described with reference to various embodiments thereof, it will be understood by those skilled in the art that various other changes in the form and details may be made without departing from the spirit and scope of the invention.

What is claimed is:

1. A method for processing an extensible markup language (XML) tagged document with a server, the method comprising:

inputting source data into the server;

converting the source data to an XML tagged document comprising an XML data subset, a document type identifier, a first data type, and a second data type;

determining the first data type and the second data type;

identifying at least one metafile associated with the first data type and the second data type determined by the determining operation, wherein the metafile comprises instructions to the server for manipulating data relating to one or more specified parameters present in the first data type determined by the determining operation and instructions to the server indicating that process results of the first data type be stored for use in subsequent processing of the second data type, wherein the server comprises a language execution broker that determines instructions for processing the XML tagged document based on the document type identifier, the document defining workflow and collaboration specifications for a given complex workflow system;

using the metafile to identify one or more data fields in the XML tagged document corresponding to the one or more specified parameters; and generating an output file, wherein the second data type is determined based on the process results obtained by the language execution broker from the processing of the first data type, and the language execution broker routes the output file to a plug-n-play engine that determines whether the document is to be processed within the complex workflow system or external to the complex workflow system.

2. The method of claim 1, wherein the first data type comprises information about wellbore operations, and the second data type comprises information about casing conditions.

3. The method of claim 1, wherein the source data comes from an operational data store.

4. The method of claim 1, wherein the metafile specifies one or more instructions for manipulating the first and second data types in the XML tagged document.

5. The method of claim 1, further comprising: creating a plurality of metafiles wherein at least one metafile corresponds to at least one of the first data type and the second data type; and wherein the operation of identifying at least one metafile further comprises accessing the plurality of metafiles to determine the at least one metafile.

6. The method of claim 1, further comprising: validating the one or more data fields in the XML tagged document.

7. The method of claim 6, wherein the validating operation further comprises: performing a form validation operation on said one or more data fields in the XML tagged document.

8. The method of claim 6, wherein the validating operation further comprises: performing a type of validation operation on said one or more data fields in the XML tagged document.

9. The method of claim 6, wherein the validating operation further comprises: performing a logic validation operation on said one or more data fields in the XML tagged document.

10. The method of claim 1, wherein the output file generated by the generating operation contains information about an oil well.

11. The method of claim 1, wherein the output file generated by the generating operation contains information about a gas well.

12. The method of claim 1, further comprising: after the generating operation, creating an output document based on the output file.

13. The method of claim 1, further comprising: after the generating operation, mining the output file for one or more patterns of the one or more data elements therein.

14. The method of claim 1, further comprising: accessing a set of rules; after the generating operation, determining whether at least one of the one or more data fields of the output file complies with at least one rule of the set of rules.

15. The method of claim 1, wherein the source data further comprises at least one of production data, drilling operations data, and combinations thereof.

16. The method of claim 1, further comprising: storing the output file, wherein the storing operation stores the output file in a persistent memory associated with the server.

17. A system for processing an extensible markup language (XML) file, the system comprising:

one or more devices in communication with a network for receiving the XML file comprising one or more data elements accessible by a server, wherein the server comprises a synchronization server configured to monitor the XML file in order to direct the XML file for further processing within the server, and a language execution broker configured to read the XML file in order to provide XML-based instructions for the further processing, and wherein the one or more devices comprise:

computer instructions for determining a first type of data and a second type of data provided in the XML file representative of the one or more data elements;

data storage comprising at least one metafile associated with the type of data, wherein the metafile comprises instructions for manipulating data related to one or more specified parameters present in the type of data and instructions to the server indicating that process results of the first data type be stored for use in subsequent processing of the second data type;

computer instructions for identifying at least one metafile associated with the first type of data and the second type of data, wherein the language execution broker provides instructions to process the second data type based on the results obtained by processing of the first data type;

computer instructions for identifying the one or more data elements in the XML file corresponding to the one or more specified parameters of the metafile; and computer instructions for generating an output file that includes the one or more data elements, wherein the second data type is determined based on the process results obtained by the language execution broker from the processing of the first data type.

18. The system of claim 17, wherein the one or more devices further comprise: computer instructions for converting, at an application server, at least one received data source file into the XML file.

19. The system of claim 18, wherein the one or more devices further comprise: computer instructions for operating an instance of a web browser in the application server, wherein said instance of the web browser provides for entry of the at least one received data source file.

20. The system of claim 18, wherein the one or more devices further comprise data storage for storing the XML file, and wherein the XML file comprises a subset of XML tailored to a specific industry to provide an interfacing scheme for data structures used to facilitate the transfer of information associated with the specific industry.

21. The system of claim 17, wherein the first data type comprises information about wellbore operations, and the second data type comprises information about casing conditions.

22. The system of claim 17, wherein the metafile specifies one or more instructions for manipulating the one or more data elements in the XML file.

23. The system of claim 17, wherein the XML file further comprises an XML tagged document that identifies an industry-appropriate data subset, and wherein the one or more devices further comprise computer instructions for validating the one or more data elements in the XML tagged document.

24. The system of claim 23, wherein the computer instructions for validating further comprise computer instructions for performing a form validation operation on said one or more data elements in the XML tagged document.

25. The system of claim 23, wherein the computer instructions for validating further comprise computer instructions for performing a type validation operation on said one or more data elements in the XML tagged document.

26. The system of claim 23, wherein the computer instructions for validating further comprise computer instructions for performing a logic validation operation on said one or more data elements in the XML tagged document.

27. The system of claim 17, wherein the output file comprises information about an oil well.

28. The system of claim 17, wherein the output file comprises information about a gas well.

29. The system of claim 17, wherein the one or more devices further comprise computer instructions for mining the output file for one or more patterns of the one or more data elements therein.

30. The system of claim 17, wherein the one or more devices further comprise a set of rules and computer instructions for determining whether at least one of the one or more data elements of the output file complies with at least one rule of the set of rules.

31. The system of claim 17, wherein the server further comprises source data that comes from an operation data store.

32. The system of claim 17, wherein the output file is stored in a persistent memory associated with the server.

33. A system for processing source data into a data format suitable for processing by a web application server, comprising:
a server comprising a synchronization server, and a language execution broker, wherein the server receives the source data after it has been converted into an XML file comprising a first data type and a second data type, wherein the synchronization server monitors the XML file in order to direct the XML file for further processing within the server;
computer readable program code devices in communication with the server which effect identification of the first data type and the second data type;
a data server in which components of the XML file are saved in one or more files, the data server comprising at least one metafile associated with the first data type and the second data type, wherein the metafile comprises instructions for manipulating data related to one or more specified parameters present in the first data type and instructions to the server indicating that process results of the first data type be stored for use in subsequent processing of the second data type;
computer readable program code devices in communication with the server which effect application of the metafile to the XML file to determine one or more data fields that correspond to the one or more specified parameters, wherein the language execution broker provides instructions to process the second data type based on the results obtained by processing of the first data type; and
a web application server which accesses the at least one or more files from the data server and manipulates the data fields thereof to provide and output to a client system connected to the web application server, wherein the output comprises one or more data fields that correspond to the one or more specified parameters, wherein
the second data type is determined based on the process results obtained by the language execution broker from the processing of the first data type.

34. A computer program product comprising:
a computer usable medium and computer readable code embodied on said computer usable medium for converting an extensible markup language (XML) file to data elements accessible by a server, the computer readable code comprising:
computer readable program code devices configured to cause the computer to effect a receiving of an XML file comprising a data file configured for the oil and gas industry;
computer readable program code devices configured to cause the computer to effect a determining of a first data type and a second data type provided in the data file;
computer readable program code devices configured to cause the computer to effect an identifying of at least one metafile associated with either of the first data type or the second data type determined by the determining operation, wherein the metafile comprises instructions to the server for manipulating data relating to one or more specified parameters present in any of the types of data determined by the determining operation and instructions to the server indicating that process results of the first data type be stored for use in subsequent processing of the second data type, wherein the server comprises a language execution broker;
computer readable program code devices configured to cause the computer to effect use of the metafile to identify one or more data elements in the data file corresponding to the one or more parameters; and
computer readable program code devices configured to cause the computer to effect a generating of an output file which includes the one or more data elements, wherein
the second data type is determined based on the process results obtained by the language execution broker from the processing of the first data type.

* * * * *